United States Patent [19]
Collier

[11] 3,895,183
[45] July 15, 1975

[54] WATERBORNE VEHICLE TRAINER VISUAL SYSTEM

[75] Inventor: Albert F. Collier, Harpursville, N.Y.

[73] Assignee: The United States of America as represented by the Secretary of the Navy, Washington, D.C.

[22] Filed: Oct. 29, 1973

[21] Appl. No.: 410,936

Related U.S. Application Data

[63] Continuation-in-part of Ser. No. 192,532, Oct. 26, 1971.

[52] U.S. Cl. .......... 178/6.8; 35/12 N; 178/DIG. 35
[51] Int. Cl.² .................................. H04N 7/18
[58] Field of Search .......... 35/11, 12 B, 12 L, 12 N, 35/25, 10.2; 178/6.8, 6, DIG. 1, DIG. 35

[56] References Cited
UNITED STATES PATENTS

| | | | |
|---|---|---|---|
| 3,439,105 | 4/1969 | Ebeling | 35/12 N |
| 3,486,242 | 12/1969 | Aronson | 178/6.8 |
| 3,539,696 | 11/1970 | Sweeney et al. | 35/12 N |

Primary Examiner—Howard W. Britton
Assistant Examiner—Michael A. Masinick
Attorney, Agent, or Firm—R. S. Sciascia; J. W. Pease

[57] ABSTRACT

A visual system for use with a waterborne vehicle trainer is shown, which system has the capability of displaying both shore and sea scenes. A first camera model system provides the shore scenes in color to a television display which has its fast scan in the vertical direction. A second camera model system comprising a black and white camera-probe and a model containing coded wave elevation information develops a video signal which is used to modulate the vertical scan of the display to simulate waves for portions of the scene where waves are present. Water areas on the first model are black with blue added to indicate depth. By monitoring the red and green video a signal is obtained to indicate when modulation of the display is required to simulate waves, at which times a simulated sea color is also added to the display video. The blue signal is used along with instructor inputs to modify the black and white video to simulate waves of different heights and lengths corresponding to different sea states.

12 Claims, 11 Drawing Figures

VERTICAL SCAN

TIME

FIG. 3A — VIDEO SWITCH OR DIFFERENTIAL AMPLIFIER WITH AGC

FIG. 3B — MULTIPLEX OR FSK

WATERBORNE VEHICLE TRAINER VISUAL SYSTEM

CROSS-REFERENCE TO RELATED APPLICATION

The subject application is a continuation-in-part of U.S. application Ser. No. 192,532, filed Oct. 26, 1971 and assigned to the assignee hereof.

BACKGROUND OF THE INVENTION

This invention relates to training and more particularly to a visual display system useful in training the operators of amphibious assault vehicles.

The use of simulators for training pilots is well known. By utilizing fixed base simulators instead of actual operational equipment training costs have been significantly reduced. With the advent of more sophisticated and expensive amphibious assault vehicles it has become desirable to use the same simulation techniques to train the operators of these vehicles.

In such an assult vehicle simulator, the need for a visual system is greater than the need in an aircraft simulator where a great deal of training may be done with instruments. The assault vehicle operator is always depending on visual stimuli in his operation. In the past, assault vehicle simulators have used cameras to view water and land scenes in which the water is flat or of a fixed painted wave formation and the land is three dimensional and possibly colored. However, to present a more realistic simulation, actual sea state conditions should be presented as a visual stimuli and such sea state conditions should be obtainable for different sea states. Thus, a desirable visual system should be capable of simulating waves and surf of different lengths and heights, variable at will for different sea states.

SUMMARY OF THE INVENTION

In the subject invention a color camera is used to view adjacent portions of a model depicting sea and land scenes, the sea scene being two dimensional and in black indicating deep water, and progressive shades of blue, indicating progressively more shallow water up to the land portion. The land portion itself is three dimensional and in color. Wave state is developed from a black and white camera scanning a second model having coded wave information of a single sea state. An instructor control panel is connected through a computer to multiplying means for multiplying the single sea state and thereby selectively varying the sea state condition. Means are also provided for varying the relative movement between the second camera and the sea state coded model to depict wave movement. Additional means are provided, such as servos to coordinate the scans of the cameras, sensors to indicate a change from sea scan to land scan to indicate when wave information is needed, and multiplier means for varying the amount of blue employed in the readout of water scan.

A principal object of the invention is to provide an improved visual system for use in a simulator used to train waterborne vehicle operators. However, its inherent capability indicates utility in other simulation applications.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

A more complete understanding of the nature and objects of the invention may be had by reference to the following detailed description taken in connection with the accompanying drawing, in which:

DESCRIPTION OF THE DRAWING

FIGS. 3A and 3B are provided to show switching means for the channel switches in the water detector unit shown in FIG. 3;

DESCRIPTION OF THE PREFERRED EMBODIMENT

Figure 1:
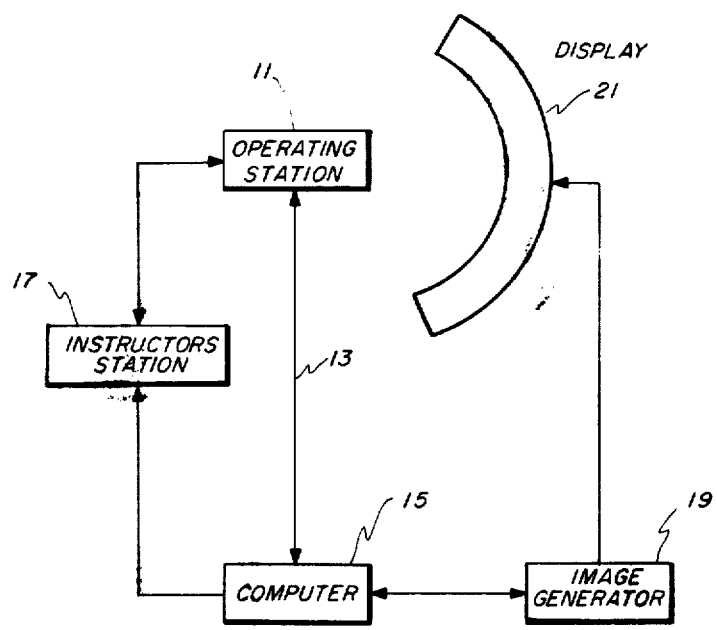
FIG. 1 is a basic block diagram of a simulator system in which the present invention may be used.

FIG. 1 shows a typical arrangement of a simulator. Block 11 is a simulated operator control station of vehicle to be simulated containing operator controls, instruments, etc. This operator control station 11 may be mounted on a motion system to add realism to the simulation. Connected to station 11 by line 13 is a computer 15. Indications of control movements and actuation of any switches, etc. will be provided to computer 15 where, along with other values, such as the characteristics of the vehicle they will be used to provide outputs to station 11 and its motion system, an instructor's station 17 and an image generator 19. The instructor's station 17 will provide inputs to computer 15 and station 11 and may also obtain outputs from one or both. These instructor's inputs will be used to set up problems for the trainee and outputs to the instructor from the trainer will indicate trainer status and also allow the instructor to evaluate trainee performance.

The image generator 19, to be described in detail below, provides an output to a display system 21 mounted on or near station 11.

In amphibious operations an assault vehicle must make its way from the open sea, through the surf and onto the beach. If it is of the type of vehicle which also is capable of land travel, it must then proceed inland from the beach for a distance. Thus a simulator to train operators must be able to display visual scenes suitable for each of these phases of operation.

Figure 2:
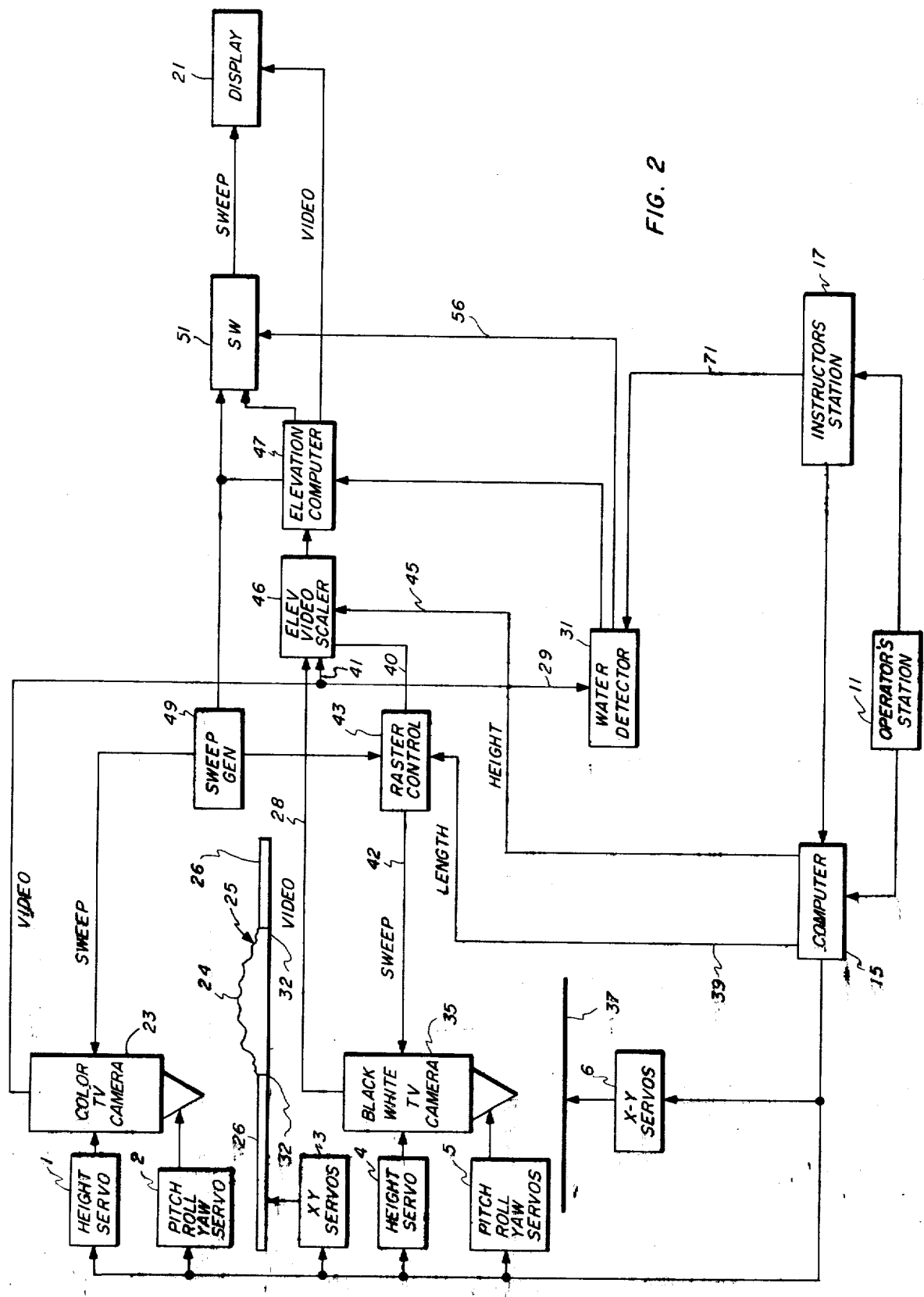
FIG. 2 is a block diagram of the preferred embodiment of the present invention.

FIG. 2 shows a basic block diagram of the preferred embodiment of the present invention. An optical probe 23 containing a color TV camera views a scale model 25 which contains terrain features 24 and is coded for water depth over the water areas 26 in a manner to be described below. Means (not shown) are provided for illumination of the model 25 at a high intensity level. The probe 23 and model 25 as a unit are capable of six degrees of freedom and are driven by servos 1, 2 and 3 which receive input drive signals from the computer 15. The six degrees of freedom are roll, pitch and yaw (servo 2), height (servo 1), and x–y movement (servo 3). Computer 15 may be of the analog type and programmed to simulate the kinematics and dynamics of a particular waterborne vehicle responsive to analog inputs from the instructor's and operator's stations. One example of a suitable computer is the single computer identified as sections 45, 46, 48 and 38 found in U.S. Pat. No. 3,486,242 (at col. 4, line 36) and identified as the Reac 550 built by Reeves Instrument Co.

The video signal on line 29 is provided to water detector 31 where water color is added to the portions of the display 21 where it is required, as will be described below.

The water portions 26 of model 25 are coded to indicate the depth of water in a unique way. The most obvious method of coding would seem to be to use shades of blue or grey. However colors from such coding would appear on all the outputs of the three color channels of the TV camera. That is, one of the colors making shades of blue or grey is white, and white is composed of the three colors, red, green and blue. Thus with such a system, decoding would be difficult.

Instead of using such a coding method, a combination of blue and black shades were chosen to color the model sections 26. That portion of the surface 26 representing uniform deep water will be all black and will be provided by coating that portion of surface 26 with black paint, black velvet or black flocking. Thus, when the probe 23 scans water, each of the three color channels from the camera 23 will have no output. When such a condition is sensed, signals representing blue color or some combination approximating the color of water will be added by block 31 to the video input signals from line 29. An arbitrary video level, line 71, from the instructor's station 17 is also provided to the water detector 31 to adjust the color of water. As the water shown on the model portions 26 changes depth and becomes more shallow when approaching the store, the model coloring in these portions is colored with more blue and less black. Coding of the remaining portions of surface 26 to represent changes in water depth is provided by coating the remaining surface with varying shades of blue paint. Darker blue to light blue will represent changes from deep to shallow water. (Blue is used here as an example. Obviously either of the other two colors will work equally well.) At this point the red and green channels will still have no output and may still be used to sense the presence of water. The blue channel may be used to provide a signal indicating water depth the use of which will be explained below. As the camera in probe 23 scans the terrain portion 24 of the model, the red and green channels will no longer have zero signals and, when the water detector 31 senses this, it will provide video to block 47 with no blue added, i.e. just the original three color signal.

The coding method has a further advantage in that small models may be used to simulate large areas. Since outside the immediate beach area water depth will increase to black coding rather quickly, it is only necessary to mount the small model on a large black surface to provide realistic simulation of small land areas in water. For example model 25 may be made in two sections with the model of the land area 24 mounted onto or into a larger black colored model of water areas 26 as indicated by lines 32.

Up to now a method of displaying blue water and terrain scenes has been described. For the simulator to have more training value, waves and not just a flat blue surface should be displayed.

In essence, the elevation data is used to control the speed of the scanning spot on the display (which has its fast scan in the vertical rather than horizontal direction) to simulate wave features. This is true since spot brightness on the display is inversely related to spot scanning speed, i.e. the slower the spot velocity the brighter the spot. Thus, as a wave is displayed the spot will scan slowly low in the trough then increase in speed near the crest where it will be slowed, waiting for what would be the crest, realistically simulating a wave, without addition of luminance information.

An optical probe 35, containing a monochrome camera, and surface 37, as a unit, have 6 degrees of freedom and track probe 23 and its associated model 25, as a unit, in the rotational degrees of freedom and altitude. The freedoms of motions of probe 35 and surface 37 as a unit will be accomplished by servos 4, 5 and 6, in the same manner as for probe 23 and terrain 25.

Translation of motions of probe 35 will be a function of combined vehicle and wave motion. That is, the probe 35 will have two translational velocity components. One of these will be the same as that imparted to probe 23 and the other will simulate wave speed. The resultant of these two components is the relative velocity between the waves and the vehicle. Resultant velocity is therefore the velocity of the wave surface 37. The resultant will be calculated by computer 15. The resultant velocity of wave surface 37 may be determined by Cosine Law which takes into consideration when the vehicle and waves have different directions of travel. Such a computation is as follows:

$R_r = \sqrt{W_r^2 + V_r^2 - 2W_r V_r \cos \theta}$ $R_r$ = resultant velocity $W_r$ = wave velocity $V_r$ = vehicle velocity $\theta$ = angle between vehicle heading and wave heading For a position servo-control, the x and y components of the wave surface 37 may be computed as follows:

$x = \int R_s \cos \psi \, dt$ $y = \int R_s \sin \psi \, dt$ $\psi$ = angle between a reference point (i.e. north) and the direction of the wave heading.

The model 37 will represent a larger area than model 25 so that when vehicle motion and wave motion are in opposite directions, causing a maximum probe velocity with respect to the model, sufficient area on model 37 will be provided. Thus, the system will also provide simulation of dynamic wave motion including the motion of the wave which may be observed when the vehicle is standing still.

The waves will be coded on surface 37 at a scale representing a single selected sea state condition. For example, the wave elevation contours of the selected sea state will be shown by continuous shades of gray. Wave troughs are represented by a dark shade and wave crests by a light shade. Shading will be proportional to height. The shading may be such that the signal output from camera 35 will be proportional to the elevation portrayed. However, in view of the single selected sea state condition, means to simulate waves of heights and lengths different from those coded are required.

Figure 2A:
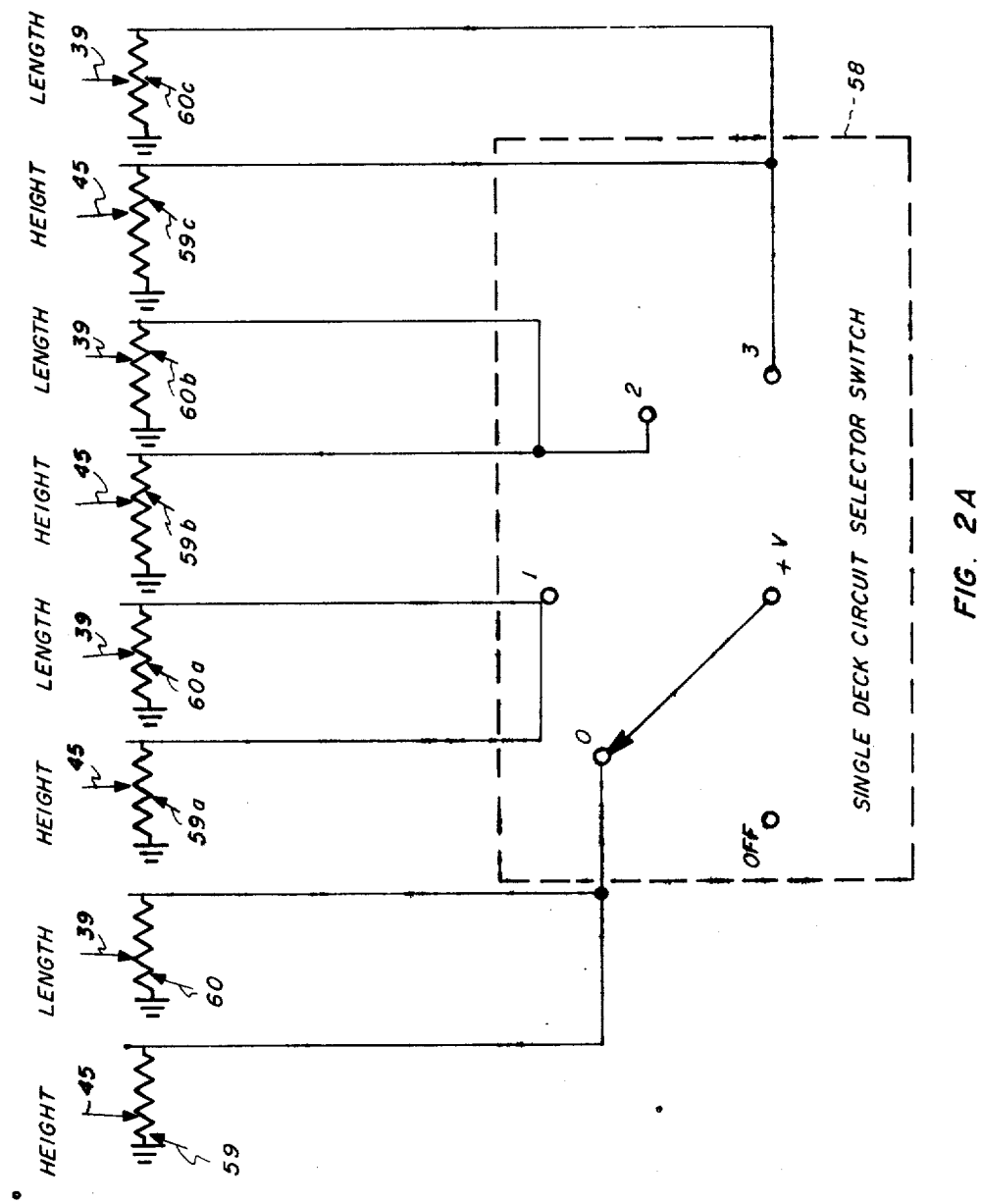
FIG. 2A is a circuit diagram of means for selecting sea-state conditions (wave height and length parameters) which means forms a part of an operators station shown in FIG. 2.

These two parameters, i.e. length and height, are functions of sea state conditions and water depth. The instructor station 17 is provided with selective signal producing means (see selector switch, FIG. 2A) to select various sea states and provide such signals as voltage analog inputs to computer 15 which in turn provides an output determination, analog voltages via lines 45 and 39, of wave height and length. Wave height and length are inputs to blocks 43 and 46 via lines 45 and 39 and thus provide for various sea state conditions. To this sea state input will be added a component obtained from the blue channel of probe 23 on line 41 to elevation video scaler 46 indicating depth. One suitable method which may be used to provide inputs of wave height and length to the raster control 43 and wave scaler 46 is shown in FIG. 2A. FIG. 2A shows a circuit diagram in which a sea-state conditions selector switch 58 is located at the instructor's station 17 and may select sea-state conditions 0 through 3 to suit the training need. From the switch 58, source of voltage, + V, is provided to potentiometers 59 and 60, or 59a and 60a, or 59b and 60b, or 59c and 60c. The wave height and length inputs 45 and 39 are voltages which are scaled to suit the conditions required by the raster control 43 and wave scaler 46.

The length output is provided to camera raster control 43 to be described hereinafter and controls the scan rate at which the surface 37 is scanned by the camera. For depicting long waves a slow scan will be used with the scan speed increasing as the wave length decreases.

The height output signal from computer 15 on line 45 (FIG. 2) will be used to modify the elevation video signal provided as an input to block 46, and the output of that block is provided to elevation computer 47, which function is to control the display spot speed. That is, the vertical (fast) sweep generated by the master sweep generator 49 will be modified in computer 47 by the elevation video. Since this modification is required only during water portions of the scene, a switch 51 is provided and is controlled by a sensor (block 77 of FIG. 3) in block 31, to switch between normal sweep (for land areas) and modified sweep (for water areas).

Figure 2B:
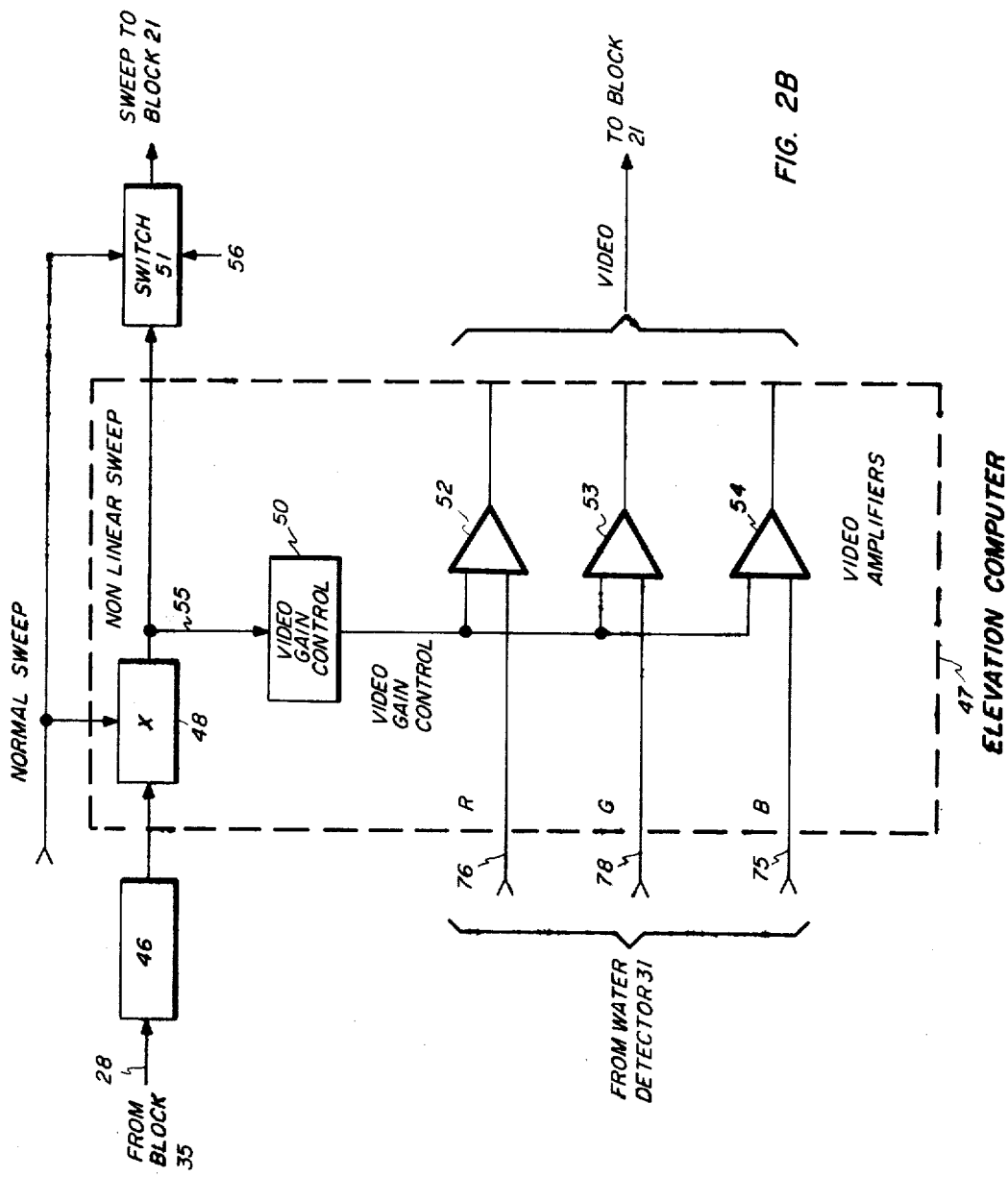
FIG. 2B is a schematic showing of an elevation computer which is shown in block form in FIG. 2.

FIG. 2B shows the details of the elevation computer 47 which is explained below. The speed of a given vertical sweep applied to the display 21 varies in accordance with wave elevation changes, as described above, and such variation in speed if not compensated for, could provide an undesired intensity variation in the final display. In order to prevent such intensity variations, the vertical sweep waveform from vertical sweep modifier 48 is applied through video gain control circuit 50 to control the gain of each of the video amplifiers 52, 53 and 54, in order to decrease the amplifier gain as sweep rate decreases and to increase the gain as sweep rate increases. Vertical sweep modifier 48 is a summing-multiplying circuit indicated by the mark "X", which performs a modifying function to form a composite voltage of two input voltages. Details of a suitable sweep modifier are shown and described in U.S. Pat. No. 3,439,105 in FIGS. 5b and 7 and at column 9, lines 43–75 and column 10, lines 1–15, as the analog form of a sweep modifier 174. Gain control 50 is merely a time derivative circuit to derive the time rate-of-change of the vertical sweep voltage from modifier 48, i.e., the sweep velocity, with a nonlinear function generator which approximately matches the display tube intensity characteristics to the control signal from sweep modifier 48. Proper gain control for preventing such undesired excessive intensity variations only requires analog multiplication of each video signal by sweep velocity. A pair of logarithmic video amplifiers (not shown) for each color video signal may be fed a luminance video signal and a sweep velocity signal, respectively, with the two amplifier outputs summed and applied to an analog amplifier to provide the desired product signal. The sweep velocity signal may be obtained by differentiating the sweep modifier 48 output signal with any one of a number of well-known video differentiating circuits. This form of intensity compensation also may be used to provide display tube "gamma" correction by scaling the mentioned summing circuit to provide a gain of one-half so as to provide a video output signal varying approximately with the square root of the product of the video signal and the sweep velocity signal. A similalr elevation computer is shown in U.S. Pat. No. 3,439,105.

Figure 3:
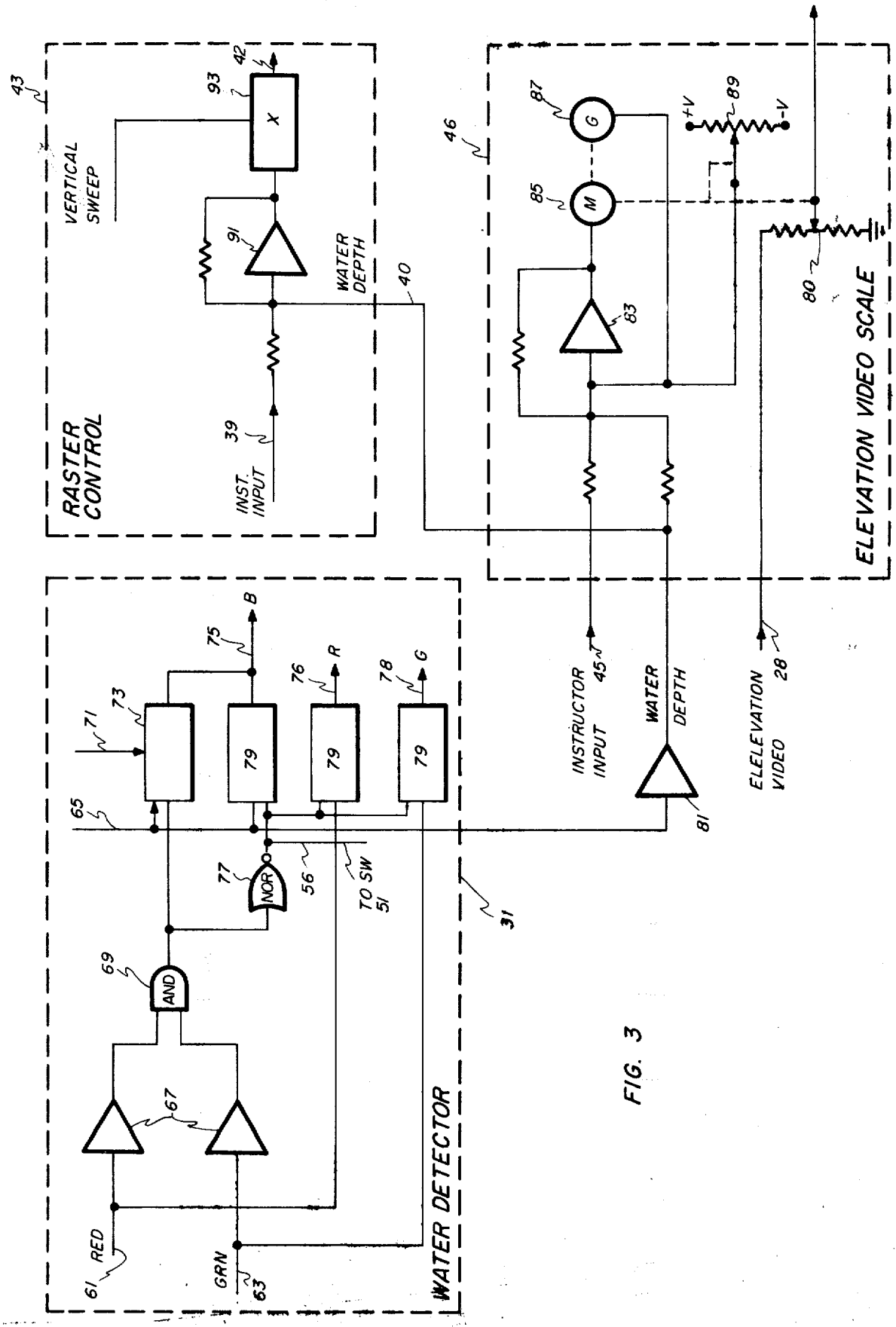
FIG. 3 is a circuit and logic diagram of the water detection and wave control portions of the embodiment of FIG. 2.

FIG. 3 shows in more detail the water detector block 31 and the elevation video scaler block 46 of FIG. 2 in association with the raster control block 43.

The three color channels from the camera in probe 23 (FIG. 2), are brought in respectively (in FIG. 3) on lines 61, 63 and 65 (flow line 29 in FIG. 2). Lines 61 and 63 are each provided as inputs to individual threshold units 67. If the video levels are below a predetermined value, units 67 will have an output. The two threshold outputs are provided to an AND gate 69 which will have an output only when both inputs are present. Otherwise it will have a zero output. Thus, if both red and green on lines 61 and 63 are near zero indicating an area of water, gate 69 will have an output. This output is used to switch a video level on line 71 and the video input from line 65 via switch 73 to the water color output line 75. (As shown in FIG. 3 the video level is all blue. However a combination of the colors may be used to obtain the desired, i.e. separate levels and switches 73 may be provided to each of the output lines.) If video is present on the red or green channels, the zero output of gate 69 will be inverted through NOR gate 77, and switches 79 will be activated allowing the red, green and blue video to pass through without change.

Switches 79 and 73 of FIG. 3 are commercially available components such as Motorola gate-controlled two-channel-input wideband amplifiers MC 1545 or MC 1445. Reference can be made to the typical application diagrams for a video switch and multiplex or FSK in the Microelectronics Data Book 2nd Edition, December 1969, published by Motorola Semi-Conductor Products, Inc. FIGS. 3A and 3B are taken from the above mentioned reference and applied to the switches 73 and 79 of FIG. 2. For switch 79, line 61 or 63 is connected to pin number 4(5) as in video switch diagram. Line from NOR gate 77 is connected to pin number 1(2) and output from pin 10(1) goes to line 75 or 76 or 78.

For switch 73, line 65 is connected to pin number 4(5) as in the multiplex or FSK diagram. Line 71 as a D.C. voltage is connected to pin number 2(3). Line from AND gate 69 is connected to pin number 1(2). Output from pin 10(1) goes to line 75.

The blue signal is also provided through a buffer amplifier 81 (FIG. 3) to the wave height control in scaler 46. It is combined with the instructor input in summing amplifier 83 which is part of a conventional servo system comprising amplifier 83, motor 85, generator 87 and follow-up potentiometer 89. Motor 85 is used to drive an attenuation potentiometer 80 which has as its input the elevation video from probe 35 of FIG. 2. The output of potentiometer 80 is provided to the elevation computer 47 of FIG. 2, where it is then scaled according to wave height.

The output, line 40, from buffer 81 is provided also to the raster control 43 (FIG. 3) where wave length is adjusted. The input from buffer 81 is summed with an instructor input in summing amplifier 91 whose output is used as in input to an electronic multiplier 93 which has as its other input via line 90 the vertical sweep. Thus, the sweep amplitude will vary in accordance with the inputs selected by the instructor and the depth of water.

The multiplier of block 43 may be used to perform the functions of the servo in block 46 and vice versa.

Figure 4:
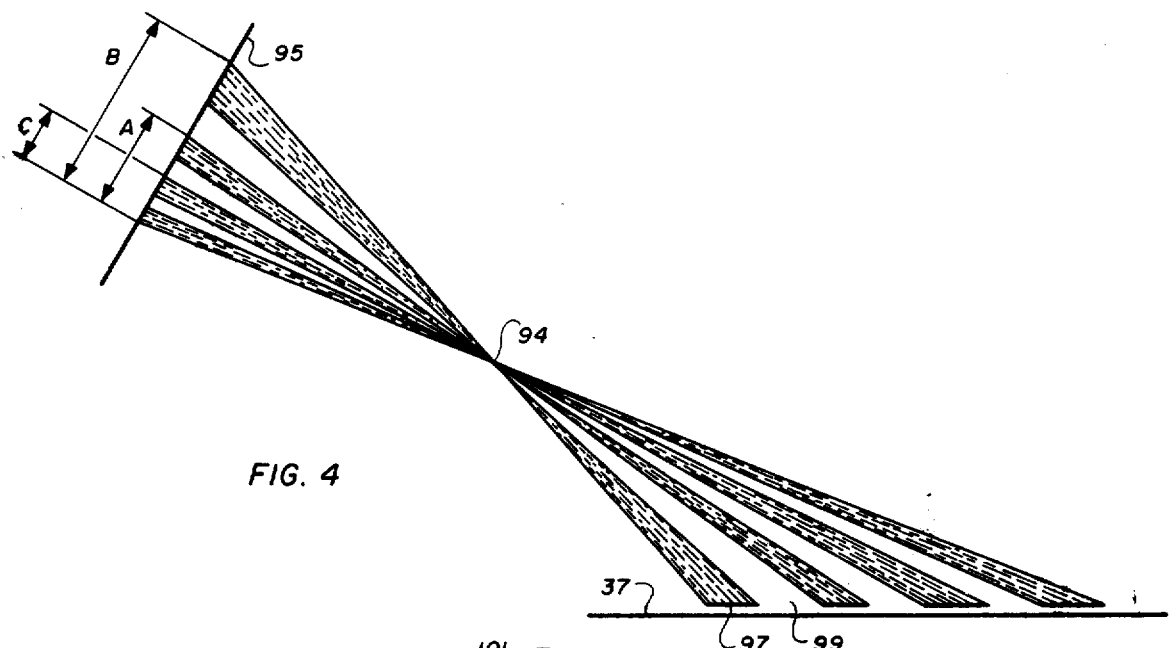
FIG. 4 is a diagram illustrating the mapping of wave elevation information on the image plane of a TV camera.
Figure 5:
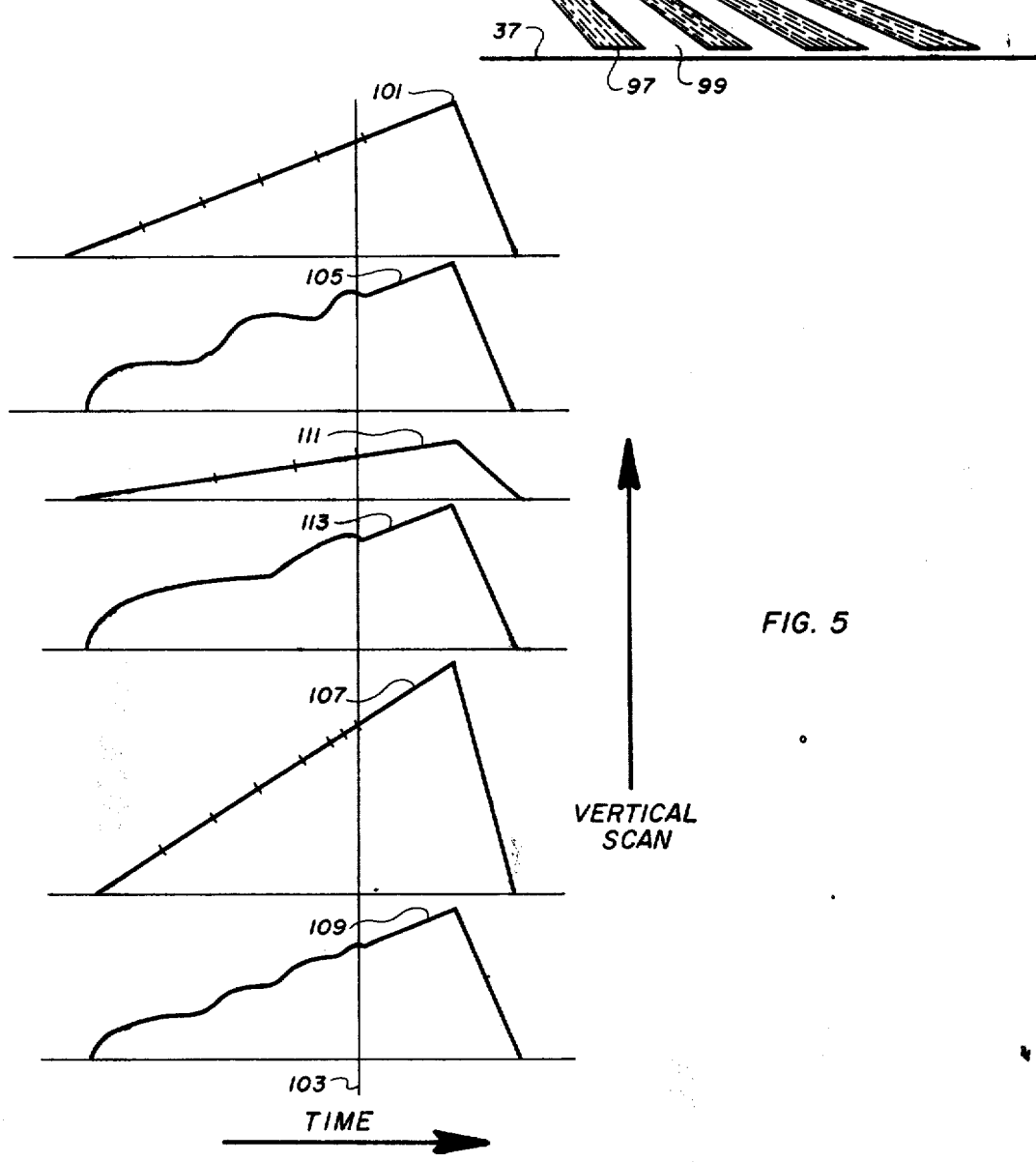
FIG. 5 is an illustration of how the information of FIG. 4 relates to different camera and display scans to simulate wave length.

A better understanding of how the magnitude of the sweep will result in waves appearing to be different lengths may be had from an examination of FIGS. 4 and 5.

Point 94 represents the lens of the probe 35 which is at the simulated eye height of an observer or operator in the simulated vehicle simulating his viewpoint, and the image plane of the camera in probe 35 is shown at 95. The coding is, as mentioned above, at a preselected scale. If the wave lengths to be simulated are at the same scale, then the camera in probe 35 of FIG. 2 should scan the image plane 95 of FIG. 4 in the same way as the camera located in probe 23 of FIG. 2 scans its image plane.

However, if waves of different lengths must be simulated the scanning of the plane 95 must be changed. While the camera of probe 23 of FIG. 2 is scanning from nadir to the horizon or to land, the camera in probe 35 must scan a smaller or a larger area. That is, in a given amount of time, i.e. the time in which the camera in 23 scans to the horizon, the camera in 35 must scan the required number of waves.

On FIG. 4 a simple example of what occurs is shown. Dark areas 97 and light areas 99 represent the coded waves and the images of these are indicated on plane 95, the TV image plane, after passing through lens 94. Since 94 is at the required simulated eye height, the perspective is maintained with the images at the bottom of plane 95 smaller than those at the top for equal distances on plane 37.

Three scan magnitudes A, B, and C are shown to represent medium, long, and short waves respectively. During the time of scan from nadir to horizon on the model 25 by the camera of probe 23 (during which time the display 21 will also scan to the horizon), the portion of the image of plane 95 to be scanned is controlled to cause waves to the desired lengths (i.e. A, B, or C) to appear in the display.

This is further illustrated on FIG. 5. Trace 101 corresponds to the sweep distance of A on FIG. 4. Three dark areas will have been swept by the time a point of line 103 representing the time at which land or the horizon has been reached by the display sweep. When the video information is processed through block 51 described above to distort the display sweep, a trace such as 105 will result, i.e. the dark and light area are used to modulate the display vertical sweep as described above. Similarly, a large amplitude camera sweep such as 111 results in only two dark areas with a resulting display sweep such as 113. Thus, waves of an equal size on the surface 37 may be made to appear longer or shorter by controlling the length of the sweep during a fixed time while the display scan remains fixed.

Figure 6:
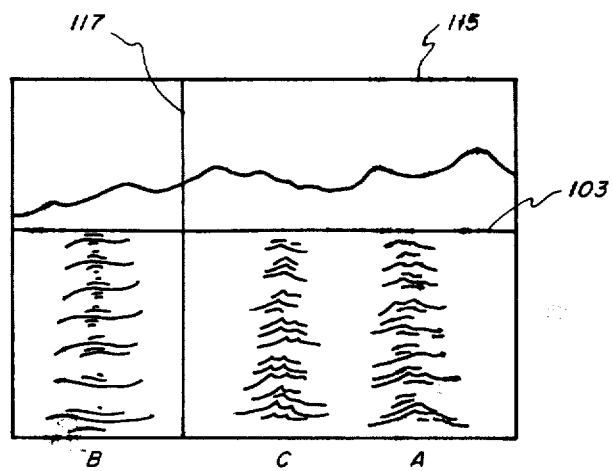
FIG. 6 is a pictorial view of the display showing waves of different lengths.

FIG. 6, shows in a simple form the scenes corresponding to the A, B, and C sweep lengths as displayed on a display screen 115. FIG. 6 in conjunction with FIG. 7, will also be helpful in understanding overall system operation. Line 117 in FIG. 6 represents a single vertical line which is swept on the display. It will start at the bottom, sweep through a water area, reach a shore line at 103 and then display the scene developed from the terrain model. In all of FIGS. 4, 5, and 6 above only a small number of waves were shown as an example. In an actual system a much larger number of waves would be scanned in most cases.

Figure 7:
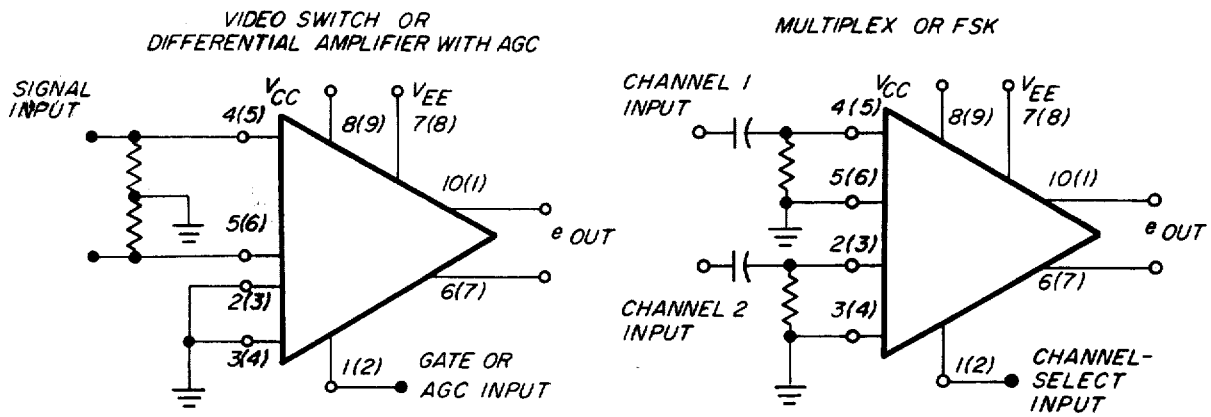
FIG. 7 is a graph of a series of wave forms present in the system showing their interrelationship for a single vertical scan line.
Figure 7:
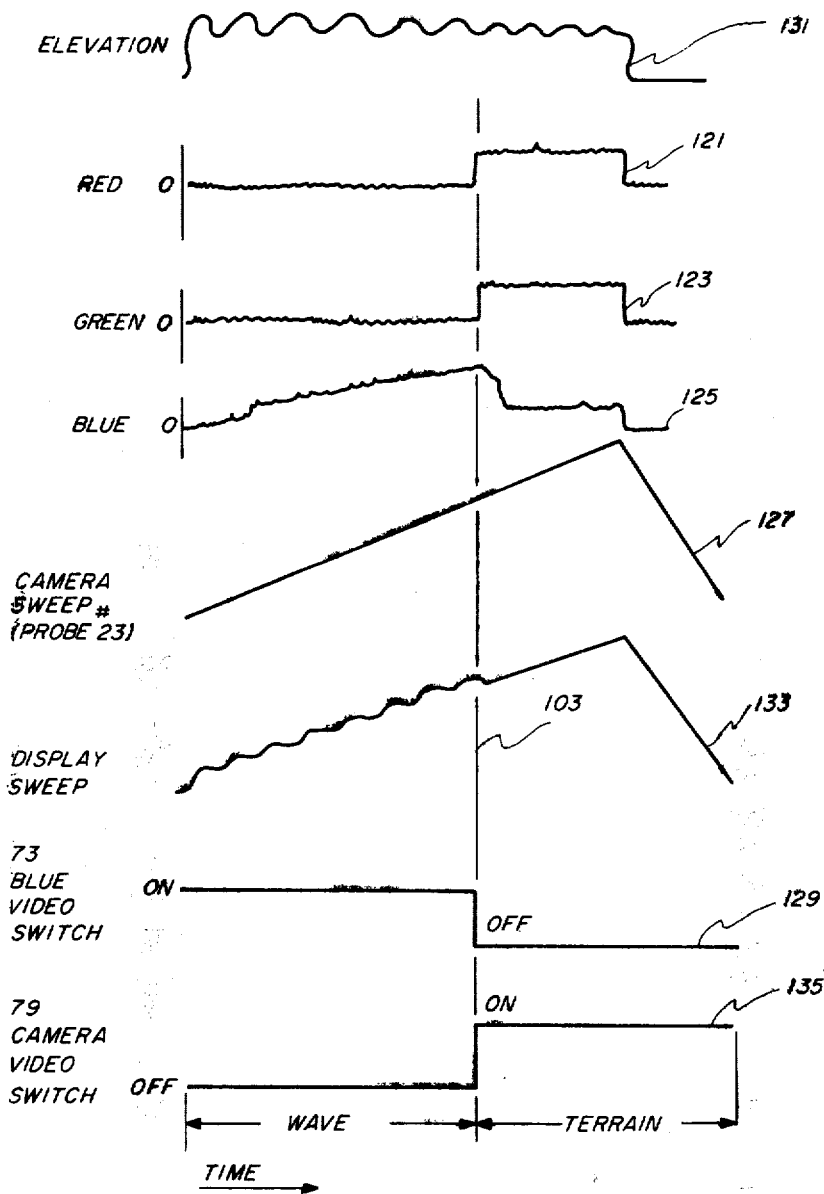

On FIG. 7 various systems waveforms are shown. As the line 117 of FIG. 6 starts its scan, the color viewed by probe 23 of FIG. 2 will be all black. Thus the red, green, and blue video signals represented by waveforms 121, 123 and 125 respectively will be at near zero levels. The camera sweep for the camera in probe 23 is as shown by trace 127 in FIG. 7 (the sweep of the camera in probe 35 is on the same time base but has its amplitude and velocity profile modified as described above in connection with FIG. 5 by raster control). The action of the switch 73 of FIG. 3 providing the water color to the display is as shown on waveform 129. Switch 51 which switches in the modulated sweep from computer 47 has the same waveform as waveform 129. The video obtained from probe 35 and used by elevation computer 47 to modulate the sweep is as shown on waveform 131. The resulting display sweep output from block 47 is shown by waveform 133.

As camera sweep 127 moves toward the shoreline 103, the blue level channel will increase, since more blue is contained on model 25 as shown in waveform 125 modifying the height and length of the waves as described above. When line 103, representing land or horizon, is reached, red signals (121) and green signals (123) will no longer be zero, the blue switch 73 of FIG. 3 output waveform 129 will be turned off, the camera video (red, green, and blue) will be switched by switches 79 of FIG. 3 with an output to the display waveform 135, and switch 51 of FIG. 2 will connect the normal vertical sweep to the display. Thus, for the portion of the scan lines to the left (on FIG. 7) or below (FIG. 60 line 103, artifically simulated waves will be provided. For the remainder of the scan a normal camera model type display will result.

Thus a visual system which can simulate waves of varying length and height and may be used for training amphibious assault vehicle operators has been shown.

What is claimed is:

1. Display apparatus for creating a simulated view of shore line and sea water with waves, said apparatus comprising:

a. a first model of a shore line having a representation of land on one side of said line and a representation of the sea water on the other side of said line;

b. a first probe including a color sensitive scanning camera having a first blue video channel and additional video channels or red and green and mounted for movement over and viewing of said model;

c. said sea water representation being colored in part with the color black representing deep water and which produces no signal output from said color camera, and in part with a blue color of increasingly light shades with decrease in simulated water depth to shallow water which color produces a signal output from said blue color channel of said color camera;

d. a display device comprising a scannable surface upon which the simulated view appears, and sweep generator means providing vertical scanning of said surface at a higher rate than the horizontal scanning of said surface;

e. second model means color coded to store an elevation profile of waves;

f. a second probe means including a monochromatic camera mounted to scan said second model to obtain from said stored profile a wave signal representative of instantaneous wave elevation as said display device is scanned;

g. sweep modification means connected to receive said wave signals for modifying the vertical scanning of said display surface in accordance with said wave signal to produce a display of simulated waves;

h. means for adding to the output of said color camera, signals representative of water color when said blue color is the only color output from said color camera;

i. switch means having a first condition connecting said blue channel video only and said modifying vertical scanning signals to said display to simulate waves and a second condition connecting all three video channels to said display with no modifying signal, said states relating respectively to sea scan and land scan; and j. sensor means connected to monitor the output of the red and green channels of said color camera to obtain a signal for actuating said switch means to said first and second conditions alternately, depending respectively upon the absence or presence of output signals from said red and green channels.

2. Apparatus according to claim 1 wherein the land and shallow water portion of said first model is separable from the sea portion to provide for selective simulation of different land and beach areas.

3. Apparatus according to claim 1
a. the area represented by said second, coded model, being greater than that represented by said first model.

4. Apparatus according to claim 1 wherein said switch means include:
a. a sweep modulation switch having one input connected to the normal vertical sweep of said color camera, its other input connectable to said sweep modification means to modify said vertical sweep and its output connected to said display, and b. means responsive to said sensor means to activate said connectable other input to said switch to produce wave simulation.

5. Apparatus according to claim 4 wherein said switch means also include:
a. a plurality of channel switches for the red, blue and green video channels and a separate individual switch for passing the blue channel video and accepting a controllable input signal for varying the strength of the blue video signal, b. said plurality of switches and said individual switch being connected for alternate operating condition, the individual switch "on" when the plurality of switches are "off" and vice versa, responsive to operation of said sensor means to produce single channel output for sea scan and the full three channel output for land scan.

6. Apparatus according to claim 5, said sensor means including:
a. a first threshold unit set to provide an output when its input is below a predetermined value near zero and having its input connected to said red video channel, b. a second threshold unit similarly set and having its input connected to said green video channel, c. an AND gate connected to receive the outputs of said threshold units and providing an activating output to said individual channel switch, d. an inverter having its input connected to the output of said AND gate and providing an output switching signal to said plurality of channel switches.

7. Apparatus according to claim 4 wherein:
a. said sweep modification means comprise a first multiplier multiplying said monochromatic video signal by a combined function of water depth and at least one of said manual selectable control signals from said instructor's station to change wave height and a second multiplier multiplying the vertical sweep supplied by said monochromatic camera by a combined function of water depth and at least one of said manually selectable control signals from said instructor's station.

8. Apparatus according to claim 7 wherein at least one of said multipliers is a servo amplifier.

9. The invention according to claim 7 wherein at least one of said multipliers is an electronic multiplier.

10. Apparatus according to claim 4 including:
a. a computer programmed to provide various output signals representative of different wave lengths and heights constituting different sea state conditions, and b. an instructor's station having means providing manually selectable signal outputs connected to address said computer and condition its output to operator selected sea state conditions.

11. Apparatus according to claim 10 including:
a. servo means connected to said first probe means and its associated first model means and said second probe means and its associated second model means to provide six degrees of freedom therein and cause said second probe and second model to track said first probe and first model.

12. Apparatus according to claim 11 wherein:
a. said computer is programmed to selectively vary the relative movement of said second probe and its associated second model to provide the effect of moving waves, and b. means in said instructor's station for addressing said computer to develop the required outputs therefrom to provide the selected desired wave movement.

* * * * *